3,616,708
ROTARY POWER TRANSMISSION ASSEMBLY
Charles S. Davis, New York, N.Y., assignor to
Curtiss-Wright Corporation
Filed June 10, 1970, Ser. No. 44,918
Int. Cl. F16h 57/00, 37/06
U.S. Cl. 74—410                                        9 Claims

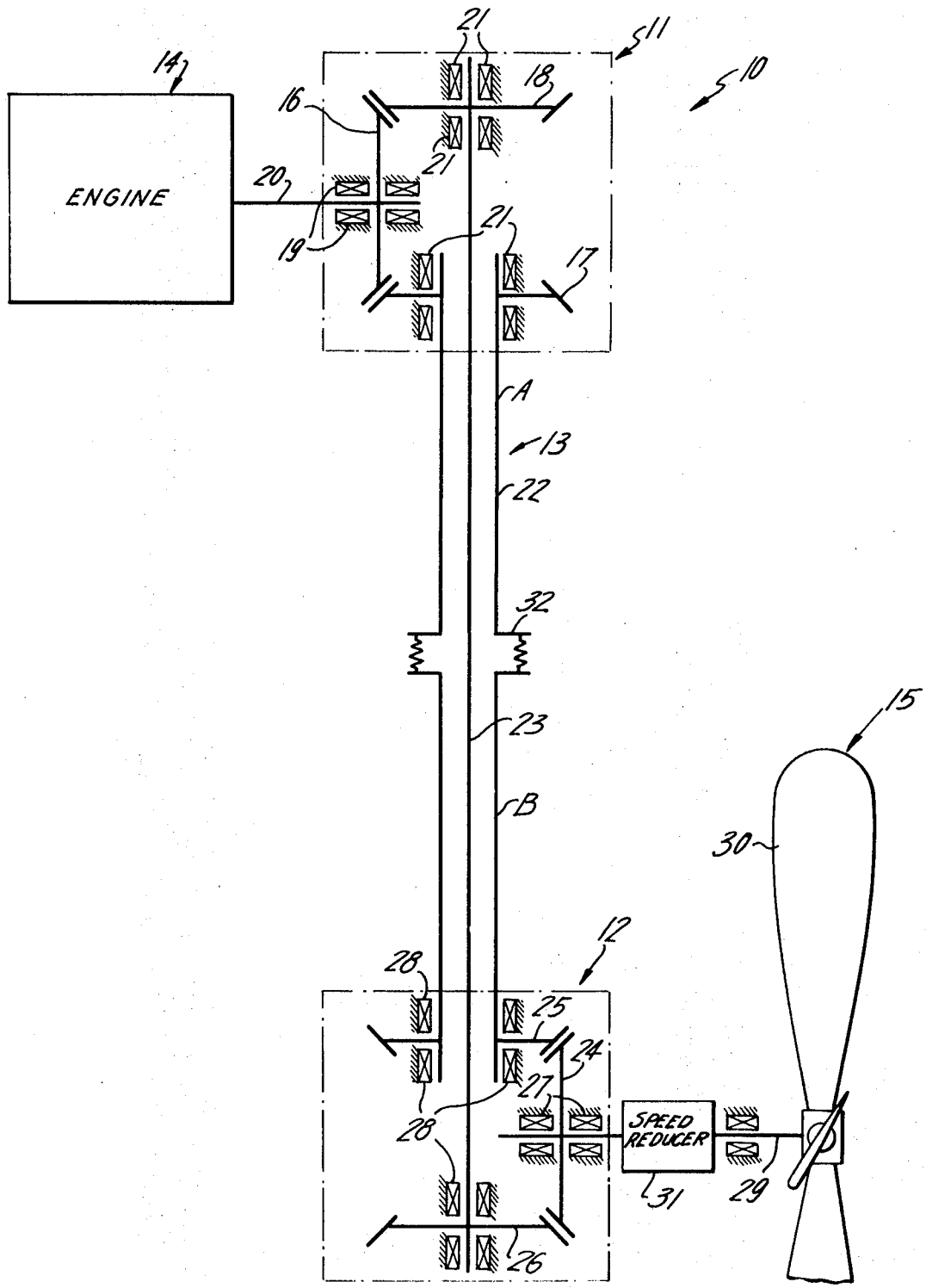

ABSTRACT OF THE DISCLOSURE

The rotary power transmission assembly comprises two spaced approximately right-angled gear drives in which one of the drives is constructed and arranged to divide the input torque into two torques and the other drive of similar construction, but arranged to combine the two torques into a single output torque. The two torques are transmitted from one right-angled gear drive to the other by two shafts disposed one within the other to provide a relatively compact assembly. A torsionally flexible coupling is arranged to coact with the shaft of greatest rigidity to provide such shaft with an effective torsional deflection rate substantially equal to the torsional deflection rate of the less rigid shaft. A vibration dampening means is provided to coact with one or more bearings located closest to the point of vibration antinode to minimize resonant vibrations. The torsionally flexible coupling and the vibration dampening means contributing to providing equal loading on the teeth of the meshing gears of the right-angled gear drives and the minimization of fretting corrosion and failure of the gear teeth.

This invention relates to power transmission assemblies and, more particularly, to substantially right-angled gear drive assemblies for the transmission of rotational power from a source of rotary power, such as an internal combustion engine, to a propulsion means, such as a wheel, drive gear, propeller, fluid jet pump, or the like.

BACKGROUND OF INVENTION

Conventional power transmission assemblies of the Z type wherein two sets of right-angled gear drives are employed to transmit high torque loads at high angular velocity (r.p.m.), such as 40,000 horsepower at 4,000 r.p.m., the gears must be of relatively large size as well as having a pitch line velocity which is excessive for marine applications and close to the maximum limit for aircraft applications. To avoid the large gear sizes and pitch line velocities, these high powered gear Z drives usually employ bevel gear means in combination with a plurality of parallel shafts to subdivide the input torque into a plurality of smaller torques and then combining these smaller torques into a single output torque, hereinafter referred to as multi-shaft, right-angle gear drives. An example of multi-shaft, right angle gear drives is disclosed in the United States patents to Taylor, No. 2,248.792 and Hunter et al. No. 2,326,860. Geared Z drive assemblies employing single as well as multi-shaft, right-angle gear drives are relatively bulky and, therefore, unsuitable in installations where available space is small; as for example, in hulls of vessel wherein propulsion is achieved through narrow sized hull sponsons. In addition, geared Z drive assemblies have had relatively short operative lives because of torsional instability and unbalanced loading on the gears due to bearing clearances and shaft deflections. These factors have caused instability and overload failure of the gears. More specifically, failures have been in the form of tooth fracture, gear rim fracture, tooth pitting, scoring and/or scuffing.

Accordingly, it is an object of this invention to provide a Z type rotational power transmission assembly capable of transmitting high torque loads at high angular velocities yet of relative small, compact size.

It is another object of the present invention to provide a Z type rotational power transmission assembly wherein torsional instability, resonant vibrations and unbalanced gear loadings are obviated to thus provide the transmission with a relatively long operative life and high operational reliability.

A feature of this invention is the shaft-in-shaft arrangement which interconnects the two right-angle gear drives to effect transmission of rotation from one right-angle gear drive to the other. This feature contributes to the compactness of the transmission assembly and increases its suitability for applications where space is limited.

Another feature of this invention is the incorporation in the shaft of the greatest torsional rigidity, a torsionally flexible coupling to equalize the torsional deflection rate or "wind-up" of the shafts, and thereby contribute to the substantially uniform loading of the gear teeth of the gear train.

SUMMARY OF THE INVENTION

The present invention contemplates a novel rotary power transmission assembly of the Z type comprising two right-angled gear drives interconnected by two shafts disposed one within the other to transmit rotation from a source or rotational power to an output member. The gear drives are of similar construction wherein rotation is transmitted between two shaft gears supported in meshing relation to an intermediate gear means. The shaft gears of one right-angled gear drive are connected to one end portion of the shafts while the shaft gears of the other right-angled gear drive are connected to the opposite end portions of the shafts. The intermediate gear means of one right-angled gear drive is drivably connected to a source of rotational power while the intermediate gear means of the other right-angled gear drive is drivably connected to an output member to be rotated, such as a wheel, gear, fluid jet pump, propeller, or the like. A plurality of radial bearing means are provided to support the shafts, shaft gears and intermediate gears for rotation. The combination according to this invention includes a torsionally flexible coupling incorporated in the shaft of greater torsional rigidity and selected and/or adjusted so that the torsional deflection rate of the shaft substantially matches the torsional deflection rate of the less rigid shaft. This feature contributes to the uniform loading of the gear teeth of the gear means of the right-angled gear drives. To further insure against premature failure of the transmission assembly, the invention includes the use of one or more vibration dampening means disposed as close as possible to the vibrational antinodal point as possible. Preferably, the vibration dampening means is associated with one or more of the radial bearings and functions to produce a counter or reaction force automatically generated hydraulically or by a hydrodynamic lubricant film, such as disclosed in the United States patents to Holben et al., No. 2,631,-901 and Kulina, No. 3,456,992. As a further refinement according to the present invention, the bearing supporting the intermediate gears may be provided with a larger than normal tolerance, as for example from a conventional clearance of approximately one thousandth of an inch (.0001) for each inch of bearing diameter to about three thousandths of an inch (.0003) for each inch of bearing diameter. This increased clearance allows the intermediate gear to further refine the division of load between the dual torque paths by a radial motion to a load center axis that is eccentric with the geometric axis thus obviating the above-mentioned typical gear failures.

BRIEF DESCRIPTION OF THE DRAWING

The invention will be more fully understood from the following description when considered in connection with the accompanying drawing, in which a rotational power transmission assembly of the Z type according to this invention is schematically shown.

DESCRIPTION OF PREFERRED EMBODIMENT

As shown in the drawing, the rotational power transmission assembly 10 of this invention broadly comprises an input right-angled gear drive 11 (hereinafter referred to as "input drive") and an output right-angled gear drive 12 (hereinafter referred to as "output drive") interconnected by a shaft-in-shaft assembly 13 to transmit rotational power from a source of rotational power 14, such as an internal combustion engine, to an output load means 15, such as a propeller, wheel, gear or the like.

The input drive 11 comprises a drive gear 16 drivably connected to two shaft gears 17 and 18. The gears are preferably of the bevel or hyperboloidal (commonly called hypoid) type. Drive gear 16 is supported for rotation in suitable bearings 19 and is connected to one end of a drive shaft 20, the opposite end of the drive shaft being connected to rotational power source 14. The shaft gears 17 and 18 are rotatively supported by a plurality of bearings 21 of the radial and thrust types to mesh with diametrically opposite sides of drive gear 16. The shaft gear 17 is connected to one end of a tubular sectional shaft 22 of shaft-in-shaft assembly 13 to rotate shaft 22 while shaft gear 18 is connected to rotate a shaft 23 of shaft-in-shaft assembly 13.

The output drive 12, may be of identical construction as input drive 11 and disposed in a reverse manner to or mirror image of input drive 11. Output drive 12 comprises a driven output gear 24 and two shaft gears 25 and 26 drivably connected to driven output gear 24. The driven output gear 24 is journalled in bearings 27 while shaft gears 25 and 26 are supported for rotation in bearings 28 of the radial and thrust types. The driven output gear 24 and the shaft gears 25 and 26 are preferably of the bevel or hypoid type. The shaft gears 25 and 26 are connected, respectively, to sectional shaft 22 and shaft 23 of shaft-in-shaft assembly 13 to be rotated by the shafts. The driven output gear 24 is connected to an output shaft 29 which, in turn, is connected to a propeller 30 which may constitute the output load means 15. A speed reducer 31 may be disposed between driven output gear 27 and propeller 30 if it is desired to operate propeller 30 at a lesser angular velocity than the angular velocity of driven output gear 27. Obviously, in place of speed reducer 31, the geometry of gears of input and output drives 11 and 12 may be made to effect a reduction in angular velocity from the angular velocity of input shaft 20.

In accordance with the present invention sectional shaft 22 comprises two tubular sections A and B joined together in endwise relationship by a flexible coupling 32. The flexible coupling 32 may be of any type well known to those skilled in the art and such as disclosed in the United States patent to Nelson, No. 1,734,043 and United States Patent No. 2,127,996 to Havill. The purpose and function of flexible coupling 32 which involves another aspect of this invention will be more fully explained hereinafter. The shaft 23, to which shaft gears 21 and 26 are connected at opposite end positions of the shaft, is disposed coaxially within tubular sections A and B of shaft 22 so that structural compactness of transmission assembly 10 is achieved.

In operation of transmission assembly 10, rotational power is transmitted from the suitable power source 14 to drive gear 16, via drive shaft 20. This rotational power may be of the magnitude of the order of 40,000 horsepower at 4,000 r.p.m. which would necessitate, through a single shaft Z type transmission assembly, gears of excessive size and having excessive pitch line velocities. The torque input to drive gear 16 is transmitted to and divided between shaft gears 17 and 18, so that each gear carries half the load. Rotation of shaft gears 17 and 18 of input drive 11 is transmitted to shafts 22 and 23, which in turn, effect rotation of shaft gears 25 and 26 of output drive 12. The torque load from each of the shaft gears 25 and 26 is transmitted to output driven gear 24. The full power of drive shaft 20 less frictional and other line losses is restored to driven output gear 24 and output shaft 29. Rotation of output shaft 29 effects rotation of propeller 30 and, if rotary motion is conveyed through a speed reducer 31, at a lesser angular velocity than drive shaft 20.

In the operation, transmission assembly 10, as herein described, is subject to various operational factors which, if not obviated, would result in its having an unreliable and relatively short operative life. One such factor is torsional imbalance resulting from unequal deflection or "wind-up" rates of shafts 22 and 23. Another factor is resonant vibrations resulting from the fabricating tolerances inherent in the bearings and gears. A still further factor is vibrational instability of the parallel load paths which may be in resonance at speeds within the operational range. When these factors are not eliminated or substantially fully compensated for, gear teeth chatter, stress corrosion and breakage of the gear teeth result.

According to the present invention the first mentioned detrimental operational factor is overcome by employment of flexible coupling 32 in shaft 22. The flexible coupling 32 is employed in shaft 22 because it is assumed, for purposes of illustrating the invention, that it is torsionally more rigid than shaft 23. The flexible coupling 32 is constructed and arranged to adjust the torsional deflection of shaft 22 to that of shaft 23 for any given torque load on the shafts. Obviously, if in any given design, shaft 23 is torsionally more rigid than shaft 22 coupling 32 may be incorporated in shaft 23 without departure from the scope and spirit of this invention. The object of the invention is to match the torsional "wind-up" rates of shafts 22 and 23 by means such as flexible coupling 32.

The present invention substantially overcomes the second mentioned problem of resonant vibration in the assembly, by use of vibration dampening means (not shown) associated with one or more of the bearings 21 and 28. The dampening means is preferably of the type disclosed in the United States patent to Holben et al., No. 2,631,901 and is positioned in association with bearings 21 and 28 as close to the calculated antinodes of the assembly 10 as possible. As disclosed in the aforesaid Holben patent, the vibration dampening means functions to automatically provide hydrodynamic forces in the gear lubricant which act counter to the oscillatory movements of the gears and thus retard or dampen such vibratory movement.

In rotational power transmission assembly 10, flexible coupling 32 and vibration dampening means associated with bearings 21 and 28 cooperate to produce a power transmission assembly wherein unbalanced gear tooth loading and gear tooth failure is eliminated so that the power transmission assembly has a relatively reliable and long operative life. To further insure proper alignment of the gears 16, 17, 18, 24, 25, and 26 and balanced loading on the meshing gear teeth, bearings 19 and 27 associated with drive gear 16 and driven gear 24, respectively, may be provided with high clearances or built-in looseness of fit between the bearings and the associated gear hubs or shafts so that gears 16 and 24 have the capability of limited lateral movement relative to the gears with which they mesh to compensate for any residual error in the even distribution of torque between the two parallel paths.

It is believed now readily apparent that the present invention provides a rotational power transmission assembly of the Z type which is compact in construction and has a reliable and relatively long operative life by insuring uniform gear tooth loading and preventing resonant vibrations.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

I claim:
1. A rotational power transmission assembly of the Z type comprising:
   (a) an input, substantially right-angled gear drive having two first shaft gears driven by an input gear connected to a source of rotary power to divide the input torque;
   (b) an output, substantially right-angled gear drive having two second shaft gears drivably connected to an output gear connected to an output means to be rotated;
   (c) a shaft-in-shaft means extending between the input and output right-angled gear drives with one shaft interconnecting one of said first shaft gears with one of said second shaft gears and the other shaft interconnecting the other first and second shaft gears so that two torque loads are transmitted to the output gear to effect rotation of the output means.
2. The apparatus of claim 1 wherein said shafts of the shaft-in-shaft means have substantially the same torsional deflection rate.
3. The apparatus of claim 1 wherein said shaft-in-shaft assembly comprises a tubular outer shaft and an inner concentric shaft and in which a torsionally flexible coupling means is provided to coact with the shaft of greatest rigidity to provide such shaft with an effective torsional deflection rate substantially equal to the torsional deflection rate of the less rigid shaft.
4. The apparatus of claim 3 wherein a vibration dampening means is provided and wherein the gears of said input and output right-angled gear drives are supported for rotation in bearings, the vibration dampening means coacting with one or more of said bearings to minimize resonant vibrations in the assembly.
5. The apparatus of claim 3 wherein said shaft-in-shaft means comprises a first tubular shaft consisting of two sections arranged in endwise alignment and a second shaft disposed coaxially within said first tubular shaft, and a flexible coupling interconnecting the two adjacent end portions of the first tubular shaft sections, said flexible coupling being constructed and arranged to provide said first tubular shaft with a torsional distortion rate substantially the same as the torsional distortion rate of the second shaft.
6. A rotational power transmission assembly of the Z type comprising:
   (a) an input right-angled gear drive having two first shaft gears driven by an input gear connected to a source of rotary power to divide the input torque;
   (b) an output right-angled gear drive having two second shaft gears drivably connected to an output gear connected to an output means to be rotated;
   (c) a first tubular shaft connected at one end portion to one of said first shaft gears and at the opposite end to one of said second shaft gears to transmit one part of the divided input torque;
   (d) a second shaft disposed within and coextensive with said first tubular shaft;
   (e) the second shaft being connected at one end portion to the other of said first gears and at the opposite end portion to the other of said second gears, to transmit the other part of the divided input torque;
   (f) a torsional flexible coupling coacting with the shaft of the first and second shafts of greatest torsional rigidity to provide such shaft with an effective torsional deflection rate substantially the same as the torsional deflection rate of the less rigid shaft, and
   (g) bearing means for each of said first and second gears, the input and output gears, and
   (h) a vibration dampening means coacting with one or more of said bearings located closest to the point of vibration anti-node to minimize resonant vibrations of said assembly.
7. The apparatus of claim 6 wherein the bearings associated with said input and output gears are provided with relatively large clearances to allow limited lateral movement of said input and output gears to insure balanced loading on the meshing gear teeth of said first shaft gears and the input gear and said second shaft gears and the output gear.
8. The apparatus of claim 6 wherein said first tubular shaft is constructed of two sections arranged in endwise relationship and in which the flexible coupling interconnects the two shaft sections.
9. The apparatus of claim 6 wherein said vibration dampening means includes means for producing a hydrodynamic force acting in a direction counter to the gear movements relative to the associated bearings.

References Cited
UNITED STATES PATENTS

| | | | |
|---|---|---|---|
| 3,144,790 | 8/1964 | Davis, Jr., et al. | 74—410 X |
| 3,259,100 | 7/1966 | Kiekhaefer | 74—411 X |
| 3,368,420 | 2/1968 | Alexander, Jr. | 74—410 |
| 3,386,242 | 6/1968 | Trapp | 74—417 X |
| 3,478,620 | 11/1969 | Shimanckas | 74—417 X |

LEONARD H. GERIN, Primary Examiner

U.S. Cl. X.R.

74—411, 655 (M), 665 (P)

Disclaimer 3,616,708.—*Charles S. Davis*, New York, N.Y. ROTARY POWER TRANSMISSION ASSEMBLY. Patent dated Nov. 2, 1971. Disclaimer filed June 24, 1974, by the assignee, *Curtiss-Wright Corporation*.

Hereby enters this disclaimer to claims 1 and 2 of said patent.

[*Official Gazette August 27, 1974.*]